United States Patent [19]
Nield

[11] Patent Number: 5,483,872
[45] Date of Patent: Jan. 16, 1996

[54] METHOD AND APPARATUS FOR WEIGHTING AND BREAKING EGGS

[75] Inventor: James M. Nield, Northville, Mich.

[73] Assignee: Diamond Automations, Inc., Farmington Hills, Mich.

[21] Appl. No.: 372,427

[22] Filed: Jan. 13, 1995

[51] Int. Cl.$^6$ ............................. A23N 5/00; A47J 17/00
[52] U.S. Cl. ............................. 99/568; 99/497; 426/231; 426/299
[58] Field of Search ........................ 99/568, 569, 571, 99/572, 573, 574, 575, 576, 577, 578, 579, 580, 581, 582, 583, 497, 498; 426/231, 232, 299; 198/433, 378, 364, 448, 432

[56] References Cited

U.S. PATENT DOCUMENTS

| | | |
|---|---|---|
| 2,815,055 | 12/1957 | Willsey . |
| 3,029,849 | 4/1962 | Willsey . |
| 3,082,804 | 3/1963 | Shelton . |
| 3,133,569 | 5/1964 | Shelton et al. . |
| 3,142,322 | 7/1964 | Shelton et al. . |
| 3,180,381 | 4/1965 | Shelton . |
| 3,185,194 | 5/1965 | Ellis et al. . |
| 3,203,458 | 8/1965 | Shelton et al. . |
| 3,417,798 | 12/1968 | Shelton . |
| 4,519,494 | 5/1985 | McEvoy et al. ............. 198/448 |
| 4,863,008 | 9/1989 | Doi ............................ 198/433 |
| 5,054,384 | 10/1991 | Smith, Jr. ..................... 99/568 |
| 5,085,139 | 2/1992 | Pellegrinelli . |

*Primary Examiner*—David Scherbel
*Assistant Examiner*—Reginald L. Alexander
*Attorney, Agent, or Firm*—Kenyon & Kenyon

[57] ABSTRACT

The present invention is a device for weighing and breaking eggs, and a method for weighing and breaking eggs. The eggs are conveyed on a conveyor to an egg-weighing station, at which each egg is individually weighed. The weight of each egg is sent to a storage and processing device, where the weight values are summed to arrive at a total value for all eggs passing through the egg-weighing station. The eggs are then conveyed to an egg-breaking machine, which may also separate the contents of the eggs broken in the egg-breaking machine. The data in the processor can be used to accurately calculate the weight of eggs processed by the egg-breaking machine. In addition, this data can be used to calculate the yield of the machine, by comparing it with data regarding the weight of the shells of the broken eggs and the weight of the egg contents from the broken eggs.

20 Claims, 2 Drawing Sheets

METHOD AND APPARATUS FOR WEIGHTING AND BREAKING EGGS

BACKGROUND OF THE INVENTION

1. Field of the Invention

The present invention relates to a method and apparatus for weighing eggs which are then loaded in to a high-speed mechanized egg-breaking machine. The invention uses a conveyor to convey eggs individually through a weighing station which includes scales for measuring and recording the weight of each egg. The eggs are then fed into an egg-breaking machine, which breaks the shells of the eggs and which can also be used to separate the egg white or albumen from the egg yolk, or simply to separate the egg liquid from the egg shell. The weight of the egg albumen and egg yolk - either individually or together -as well as the weight of the egg shells broken by the machine, can also be determined to calculate the yield from the eggs fed into the apparatus.

2. Description of the Related Art

Machines for high-speed, large-volume egg breaking are known in the art. For example, U.S. Pat. Nos. 2,815,055; 3,029,849; 3,142,322; 3,185,194; 3,203,458; 3,417,798 and 5,085,139 show examples of such prior art machines. Such machines are used by large-scale egg-processors to rapidly and efficiently process eggs into liquid-egg products. Large-scale egg-processors have, in the past, measured the weight of eggs received from an egg supplier by weighing the eggs in gross - i.e., weighing a package, box or carton containing a large number of eggs and egg trays. After the weighing operation, the eggs are unpacked, the egg trays unstacked, the eggs unloaded from the trays, and the eggs are then conveyed to washing and reject-inspecting stations before being fed into the egg-breaking and separating machine.

The obvious disadvantage of the prior art method and apparatus for weighing eggs before breaking and separating is the accuracy of the weighing results. First, the weight values of the package, box or container, as well as the weight of any egg trays used inside the container, must be subtracted from the weight total measured by the scale. In addition, a certain percentage of the eggs can be damaged or lost after weighing, during the processes of unstacking, unloading, washing and inspecting the eggs. These lost eggs are not accounted for in the weight total. As a result, an egg processor may not receive accurate information regarding the weight of eggs delivered from a supplier, or the yield of the eggs which are processed through the egg-breaking and separating machinery.

SUMMARY OF THE INVENTION

The present invention solves the problems of the prior art by providing a weighing station, which weighs individual eggs as they are conveyed on a conveyor. The weighing station is located adjacent to the egg-breaking machine, and operates just before eggs are sent into the machine. According to the method of the present invention, eggs are first removed from a package or container, unstacked, unloaded, washed and inspected using known methods and apparatuses. The eggs are then conveyed on, e.g., a conventional spool conveyor, and then conveyed over scales located adjacent the egg-breaking machine. The scales measure, and send to a recording and processing device, the weight value for each egg as it passes over the scales. The recording and processing device, which can be in the form of a microprocessor, records and sums the weight values for all of the eggs passing over the scales. The weight of the shells of the broken eggs, and the weight of the contents of the broken eggs, can also be calculated after processing by the egg-breaking machine, and can be used by the processing device to calculate yields from the egg-breaking machine.

DETAILED DESCRIPTION OF THE INVENTION

Figure 1:
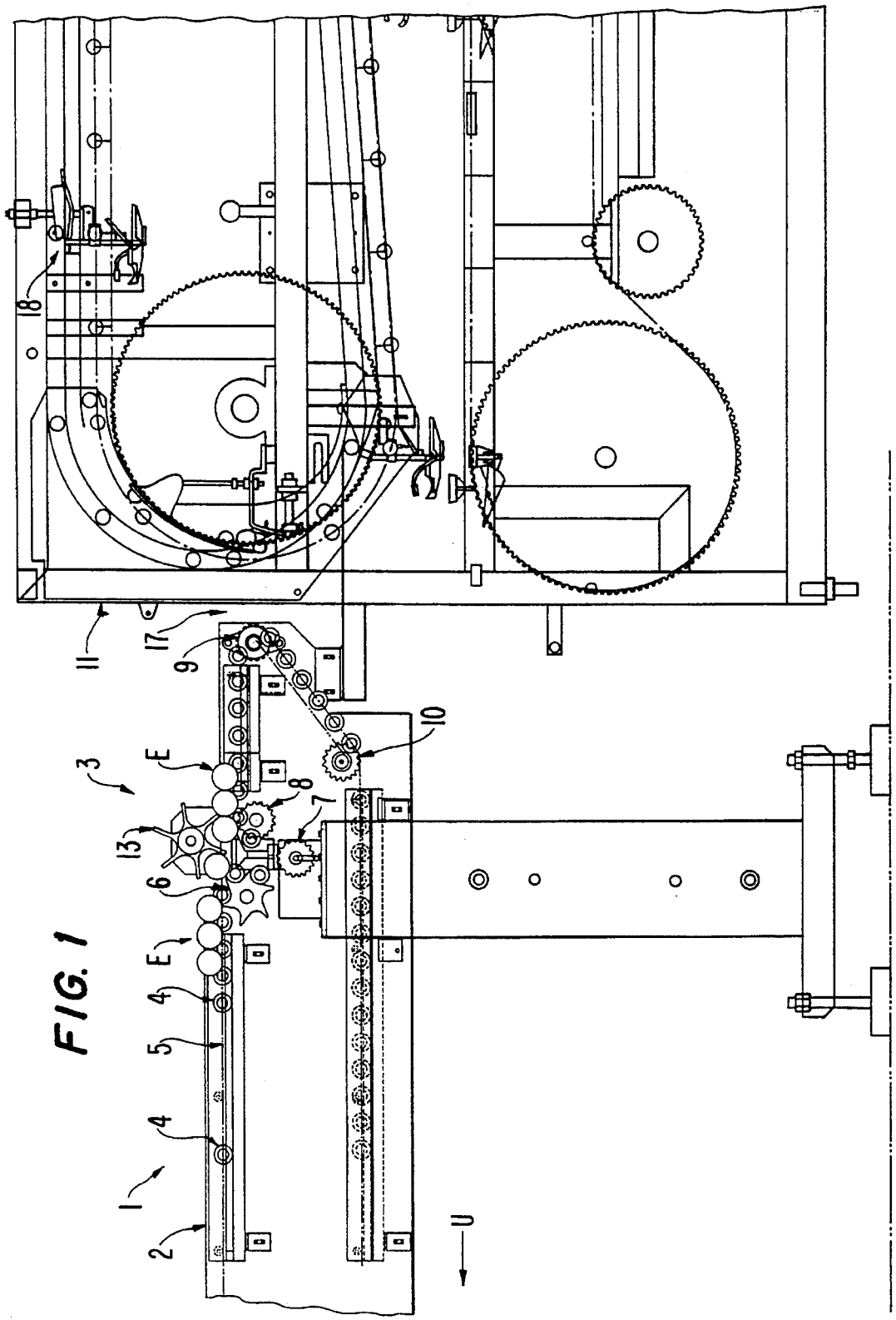
FIG. 1 shows a side view of an embodiment of the weighing and breaking apparatus of the present invention.
Figure 2:
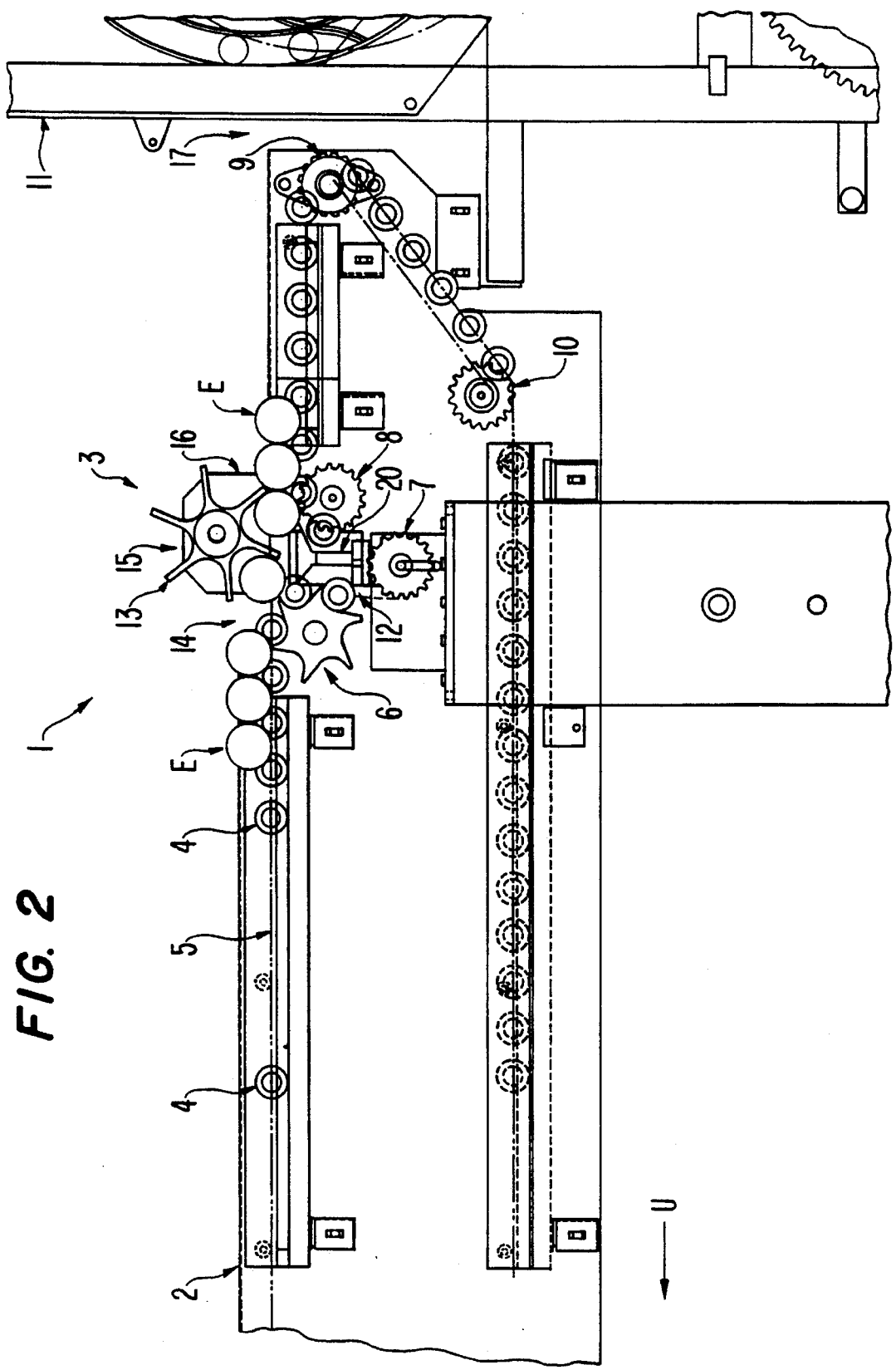
FIG. 2 shows a detail view of the weighing mechanism of the embodiment of FIG. 1.

FIG. 1 shows a side view of the egg weighing and breaking device 1 of the present invention. Upstream (indicated by arrow U) of the device 1 can be placed stations and apparatus for unpackaging, unstacking, unloading, washing and/or inspecting eggs received from an egg supplier. The eggs E are then conveyed on a conveyor 2 to a weighing station 3. Conveyor 1 can be any type of conveyor for conveying one or more rows of eggs. In the preferred embodiment the conveyor 1 is a spool conveyor conveying multiple rows of eggs via spools 4 connected to rotating chains 5 (shown schematically with dashes). Chain 5 is rotated over a series of tensioner pulleys 6, 7, 8, 9, 10, which are described in more detail below.

Located adjacent the egg-breaking machine 11 is weighing station 3. Weighing station includes one or more scales 12, with one scale being used for each row of eggs conveyed by conveyor 2. Scales 12 can be air-bearing scales, or any other type of scale appropriate for accurately weighing small items such as eggs. At weighing station 3, the conveyor 2 passes below the scales 12, such that the full weight of an egg E is placed on the scale 12 for measurement. The conveyor 2 passes below scale 12 via a series of tensioner pulleys 6, 7, and 8, which can be of any known type for changing the direction of a chain-driven conveyor. In order to advance the eggs E over the scale 12, a star wheel conveyor 13 rotates above scale 12. The star wheel conveyor 13 is timed such that it receives an egg E discharged from a discharge zone 14 in one of a number of recesses 15 around its circumference. The star wheel conveyor 13 rotates to advance the eggs E over the scales 12, and then pushes eggs E, at a loading zone 16, back on to conveyor 2. After weighing and loading of the eggs E at loading zone 16, the eggs E are conveyed by conveyor 2 to an egg breaking machine 11.

When an egg E travels over a scale 12, its weight causes the scale 12 to send a signal to a recording and processing unit (not shown). In the preferred embodiment, the scale 12 is an air-bearing scale, which has a rod 20 which is displaced a distance which depends upon the weight of the egg E. This displacement causes a signal to be sent by a solenoid mounted within the scale 12. This signal (along with all other signals generated by all the scales 12), can be sent to a processing device. The processing device can be a buffer in a microprocessor, which microprocessor sums the value of all signals sent into and stored in the buffer. The resulting sum (which is updated upon receipt of each series of scale signals into the buffer) represents the weight of all eggs transferred to the egg-breaking and separating machine 11.

After the eggs E have been weighed, the star-wheel conveyor transfers the eggs E back on conveyor 2 at loading zone 16. The eggs E are conveyed to a transfer zone 17, located adjacent a tensioner pulley 9. At the tensioner pulley 9, the conveyor 2 changes directions to travel downwardly and back to the upstream direction U. As a result, eggs E drop from conveyor 2 at transfer zone 17. Egg-breaking and separating machine, which in the preferred embodiment is of the type shown and described in U.S. Pat. No. 5,085,139, includes breaking devices 14. Breaking devices 14 include half-pans and a head which securely grasp the egg's E shell, for subsequent breaking of the egg E shell and removal of the contents of eggs E from the shell. The operation of the egg-breaking and separating machine 11 is timed such that the breaking devices 14 receive and grasp eggs E just as they are dropped from conveyor 2 at transfer zone 17.

After the eggs E have been transferred from conveyor 2 to egg-breaking and separating machine 11, the breaking devices 14 are activated to break the egg E shells and remove the contents of eggs E from the shell. The egg E contents are thereafter separated, if desired, and the shells disposed of, as shown and described in U.S. Pat. No. 5,085,139. The disposed of shells can be conveyed, using any conventional conveyor, to a shell-weighing scale, and the egg contents can be conveyed, either in their entirety or separate as albumen and yolk, to a content-weighing scale or scales. Signals from these scales can also be fed into the microprocessor, which can thereafter calculate content yields based on egg weights and shell weights.

The present invention contemplates a number of different variations on the above-described preferred embodiment. The egg-breaking and separating machine 11 can be of any known type for rapidly and efficiently breaking a large number of egg shells and removing the contents from the eggs. The conveyor 2 can be of any known type used for advancing eggs individually in rows, and which will allow the eggs so conveyed to contact a weighing device for individually weighing each egg. Any number of different apparatuses can be used to weigh the eggs E conveyed along the conveyor 2, including load cells. It is to be understood that the above description is only of one preferred embodiment, and the scope of the invention is to be measured by the claims below.

I claim:

1. An apparatus for weighing and breaking eggs comprising:

a conveyor for conveying eggs individually in at least one row;

a weighing station for weighing eggs conveyed by said conveyor, said weighing station comprising at least one scale for individually weighing eggs in said at least one row; and an apparatus for breaking eggs, said eggs being conveyed from said weighing station to said apparatus for breaking eggs.

2. A method for weighing and breaking eggs, comprising the steps of:

conveying eggs individually in at least one row to a weighing station;

weighing said eggs individually at said weighing station, said weighing station comprising at least one scale for said at least one row;

conveying said eggs from said weighing station to a breaking apparatus; and breaking said eggs at said breaking apparatus.

3. The apparatus of claim 1, wherein:

said conveyor conveys eggs individually in a plurality of rows.

4. The apparatus of claim 1, wherein: said conveyor is a spool conveyor.

5. The apparatus of claim 3, wherein:

said weighing station comprises a plurality of scales corresponding to the number of said rows.

6. The apparatus of claim 1, wherein:

said at least one scale is an air-bearing scale.

7. The apparatus of claim 1, wherein:

said conveyor passes below said at least one scale at said weighing station.

8. The apparatus of claim 7, further comprising:

a second conveyor for conveying said eggs over said scale at said weighing station.

9. The apparatus of claim 1, further comprising:

a processing device for receiving signals from said at least one scale, said processing device storing information corresponding to the weight of eggs passing over said at least one scale.

10. The apparatus of claim 1, further comprising:

an additional weighing station for weighing the shells of said eggs after said eggs have been broken by said apparatus for breaking eggs.

11. The apparatus of claim 1, further comprising:

an additional weighing station for weighing the contents of said eggs after said eggs have been broken by said apparatus for breaking eggs.

12. The method of claim 2, wherein:

said steps of conveying eggs comprises conveying said eggs individually in a plurality of rows.

13. The method of claim 2, wherein:

said steps of conveying eggs comprises conveying said eggs on a spool conveyor.

14. The method of claim 12, wherein:

said step of weighing said eggs comprises weighing said eggs on a plurality of scales corresponding to the number of said rows.

15. The method of claim 2, wherein:

said at least one scale is an air-bearing scale.

16. The method of claim 2, wherein:

said steps of conveying eggs comprises passing a conveyor below said at least one scale at said weighing station.

17. The method of claim 16, wherein:

said step of weighing said eggs comprises conveying said eggs over said at least one scale at said weighing station using a second conveyor.

18. The method of claim 2, further comprising the steps of:

receiving signals from said at least one scale in a processing device and storing information corresponding to the weight of eggs passing over said at least one scale in said processing device.

19. The method of claim 2, further comprising the step of:

weighing the shells of said eggs after said step of breaking said eggs.

20. The method of claim 2, further comprising the step of:

weighing the contents of said eggs after said step of breaking said eggs.

* * * * *